United States Patent
Shenhav et al.

(10) Patent No.: US 9,736,634 B2
(45) Date of Patent: Aug. 15, 2017

(54) SYSTEM AND METHODS FOR WIRELESS COVERAGE INDICATION

(71) Applicants: Amir Shenhav, Netanya (IL); Tomer Daniel, Herzlyia (IL); Jonathan Segev, Tel Mond (IL)

(72) Inventors: Amir Shenhav, Netanya (IL); Tomer Daniel, Herzlyia (IL); Jonathan Segev, Tel Mond (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/026,569

(22) PCT Filed: Dec. 18, 2013

(86) PCT No.: PCT/US2013/076121
§ 371 (c)(1),
(2) Date: Mar. 31, 2016

(87) PCT Pub. No.: WO2015/094226
PCT Pub. Date: Jun. 25, 2015

(65) Prior Publication Data
US 2017/0208434 A1    Jul. 20, 2017

(51) Int. Cl.
*H04W 4/02* (2009.01)
(52) U.S. Cl.
CPC .................................. *H04W 4/021* (2013.01)
(58) Field of Classification Search
None
See application file for complete search history.

(56) References Cited

U.S. PATENT DOCUMENTS

| | | |
|---|---|---|
| 2008/0319665 A1 | 12/2008 | Berkobin et al. |
| 2010/0144383 A1* | 6/2010 | Berger ............... G06Q 10/06 455/521 |
| 2010/0150122 A1* | 6/2010 | Berger ............... H04W 4/02 370/338 |
| 2011/0207486 A1 | 8/2011 | Robertson et al. |

(Continued)

FOREIGN PATENT DOCUMENTS

| | | |
|---|---|---|
| WO | 2012163671 A1 | 12/2012 |
| WO | 2013075004 A1 | 5/2013 |

OTHER PUBLICATIONS

International Search Report for Application No. PCT/US2013/076121 dated Sep. 18, 2014, pp. 1-3.

*Primary Examiner* — Diane Mizrahi
(74) *Attorney, Agent, or Firm* — Eversheds Sutherland (US) LLP

(57) ABSTRACT

This disclosure describes systems, methods, and computer-readable media related to wireless coverage indication. In some embodiments, a current location of a user device may be obtained. Coverage information of wireless coverage associated with the user device may be obtained. A change in coverage may be determined based at least in part on the current location and the coverage information. A notification may be generated based at least in part on the change in coverage. The notification may be transmitted to one or more intended recipients, such as a user of the user device (e.g., in response to a query for information associated with the change in coverage) or one or more applications executing on the user device.

20 Claims, 3 Drawing Sheets

(56) References Cited

U.S. PATENT DOCUMENTS

2013/0072144 A1* 3/2013 Berger .................... H04W 4/02
 455/404.1
2013/0308470 A1 11/2013 Bevan et al.

* cited by examiner

SYSTEM AND METHODS FOR WIRELESS COVERAGE INDICATION

CROSS-REFERENCE TO RELATED APPLICATIONS

This application claims the benefit of priority of International Application No. PCT/US13/76121 filed on Dec. 18, 2013, the disclosure of which is incorporated herein by reference as set forth in full.

BACKGROUND

Mobile devices have become prevalent with people often relying on them to stay connected during travel. Unfortunately, wireless coverage may not always be available and mobile devices are often unable to update their applications or otherwise obtain data during times when the wireless coverage is weak or otherwise unavailable. In some cases, signal boosters may be used in an attempt to obtain stronger signals in a wireless coverage area with weak signals. Often, such attempts are unsuccessful and drain the battery of the mobile devices.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

This disclosure relates to, among other things, systems, methods, computer-readable media, techniques, and methodology for wireless coverage indication. As an illustrative example, Bob and Cindy may be traveling on a road trip with a wireless user device, such as a smart phone or tablet. As Bob is driving on the highway, Cindy may be using the wireless user device to watch a movie. However, because the coverage of the wireless service may vary in its strength on different segments of the highway, the movie playing on the wireless user device may not be receiving sufficient data to play the movie without interruption or delays. Cindy may initiate the wireless coverage indication, which may alleviate her issues in watching the movie. The wireless coverage indication may alert the movie application to an upcoming area with weak or no signal. Prior to traveling through the area with the weak signal, the movie application may request additional information from its associated remote servers to obtain and buffer additional information so that the movie can continue playing without interruption.

In some embodiments, a current location of a user device may be obtained. Coverage information of wireless coverage associated with the user device may be obtained. A change in coverage may be determined based at least in part on the current location and the coverage information. A notification may be generated based at least in part on the change in coverage. The notification may be transmitted to one or more applications executing on the user device. The applications may receive the notification and initiate data synchronization or otherwise execute one or more actions prior to the predicted change in coverage.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Illustrative Use Cases and System Architecture

Figure 1:
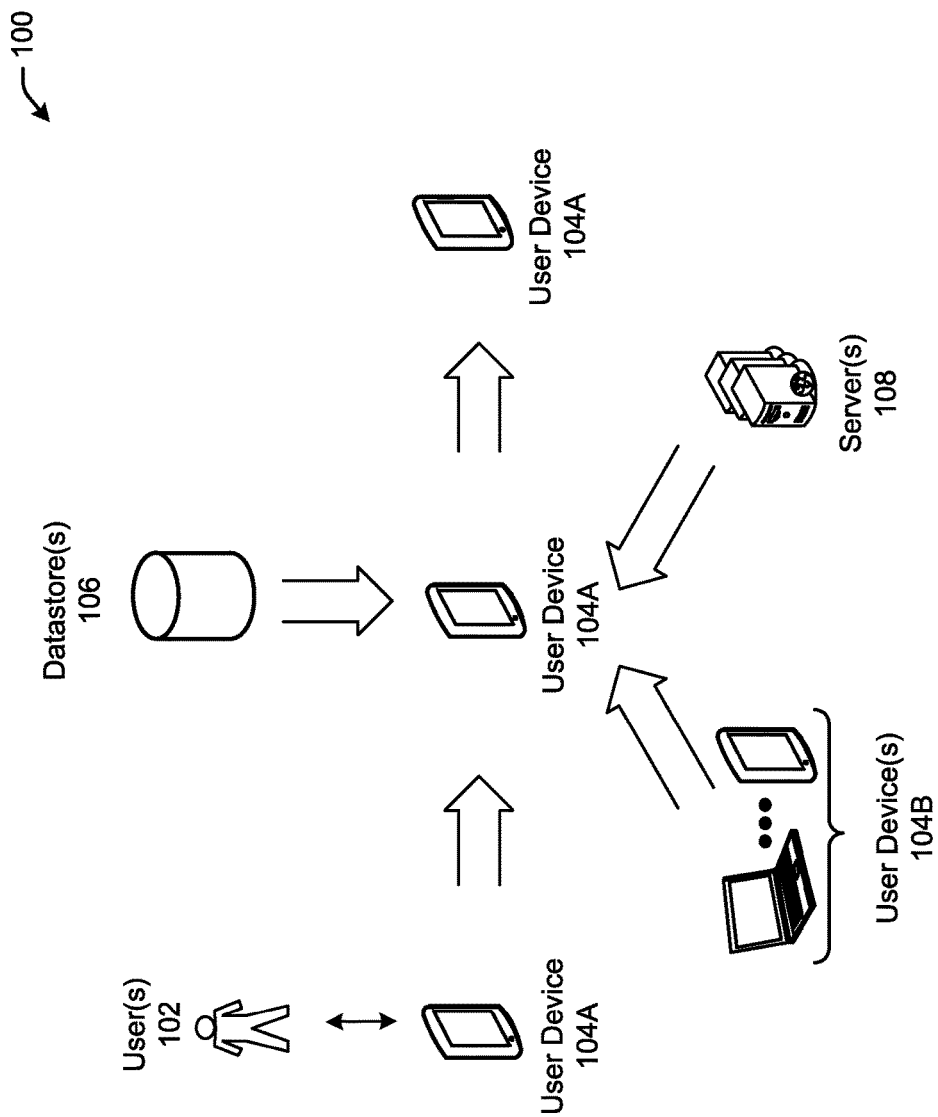
FIG. 1 depicts an illustrative data flow between various components of an illustrative system architecture for wireless coverage indication in accordance with one or more embodiments of the disclosure.

FIG. 1 depicts an illustrative data flow between various components of an illustrative system architecture for wireless coverage indication in accordance with one or more embodiments of the disclosure. One or more illustrative user device(s) 104 operable by one or more user(s) 102 are illustratively depicted in FIG. 1. The user device(s) 104 may include any suitable processor-driven computing device including, but not limited to, a desktop computing device, a laptop computing device, a server, a smartphone, a tablet, and so forth. For ease of explanation, the user device(s) 104 may be described herein in the singular; however, it should be appreciated that multiple user device(s) 104 may be provided.

The user device 104A may receive input from a user 102. In some embodiments, the user 102 may initiate the wireless coverage indication in the user device 104. Wireless coverage may indicate cellular coverage, Wi-Fi coverage, or the like. The user device 104 may obtain a current location of the user device 104A and coverage information. The coverage information may be received from one or more datastore(s) 106, one or more server(s) 108, and/or one more user device(s) 104B. The user device 104 may calculate or determine a predicted change in wireless coverage based at least in part on the current location of the user device 104A and the obtained coverage information. The user device 104A may generate a notification based at least in part on the predicted change in coverage and transmit the notification to one or more applications executing on the user device 104A. The applications may receive the notification and initiate data synchronization or otherwise execute one or more actions prior to the predicted change in coverage.

Figure 2:
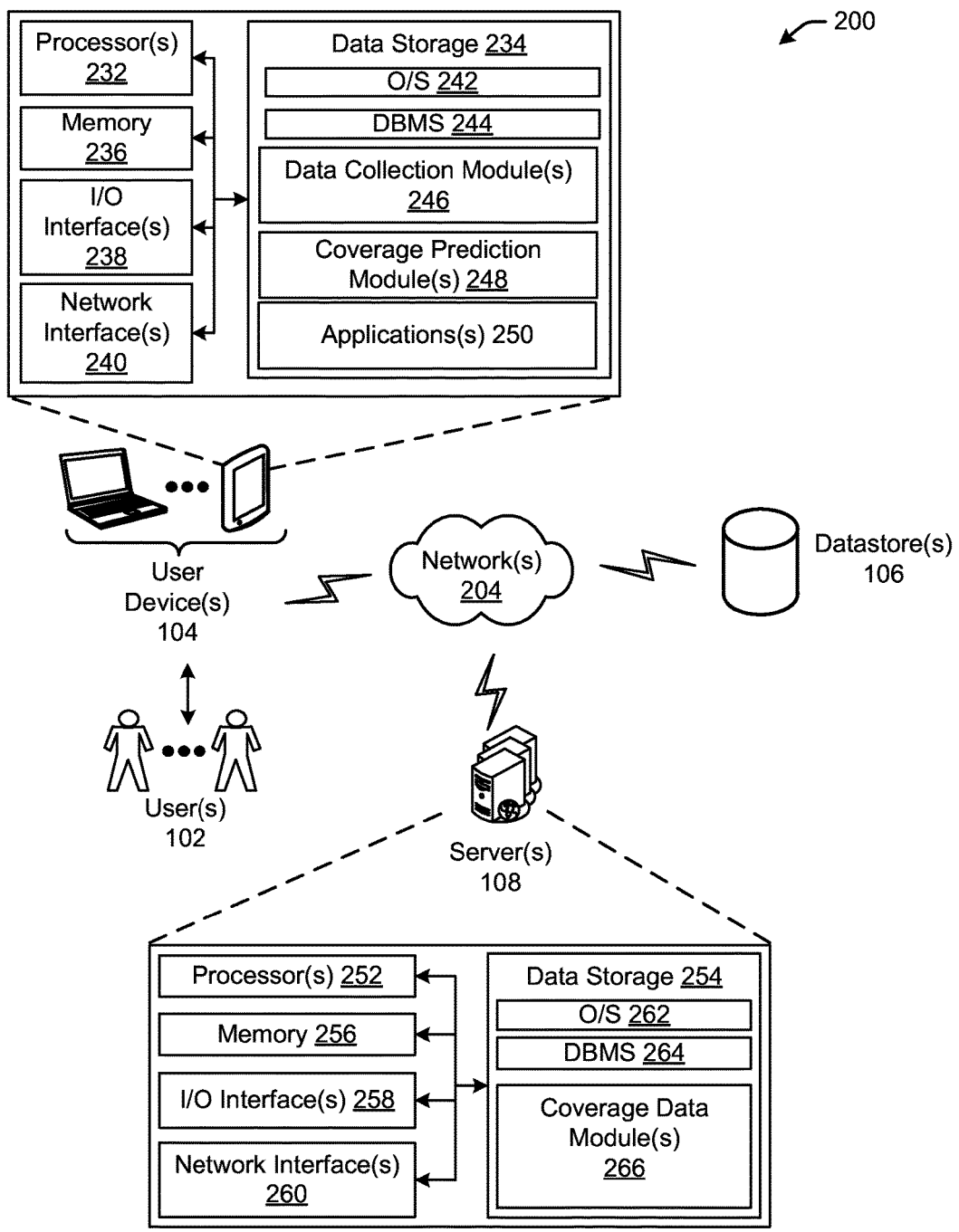
FIG. 2 is a block diagram including various hardware and software components of the illustrative system architecture depicted in FIG. 1 in accordance with one or more embodiments of the disclosure.

FIG. 2 is a block diagram including various hardware and software components of the illustrative system architecture depicted in FIG. 1 in accordance with one or more embodiments of the disclosure. The illustrative system architecture 200 may include one or more user devices 104 operable by one or more user(s) 102, one or more datastore(s) 106, and/or one or more server(s) 108. The user device(s) 104 may include any of the types of devices described through reference to FIG. 1. The datastore(s) 106 may include any of the types of devices described through reference to FIG. 1.

The server(s) 108 may include any of the types of devices described through reference to FIG. 1.

Any of the user device(s) 104, datastore(s) 106, and/or server(s) 108 may be configured to communicate with each other and any other component of the system architecture 200 via one or more network(s) 204. The network(s) 204 may include, but are not limited to, any one or a combination of different types of suitable communications networks such as, for example, cable networks, public networks (e.g., the Internet), private networks, wireless networks, cellular networks, or any other suitable private and/or public networks. Further, the network(s) 204 may have any suitable communication range associated therewith and may include, for example, global networks (e.g., the Internet), metropolitan area networks (MANs), wide area networks (WANs), local area networks (LANs), or personal area networks (PANs). In addition, the network(s) 204 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

The user device(s) 104 may include one or more processors (processor(s)) 232 and one or more memories 236 (referred to herein generically as memory 236). The processor(s) 232 may include any suitable processing unit capable of accepting digital data as input, processing the input data based on stored computer-executable instructions, and generating output data. The computer-executable instructions may be stored, for example, in the data storage 234 and may include, among other things, operating system software and application software. The computer-executable instructions may be retrieved from the data storage 234 and loaded into the memory 236 as needed for execution. The processor(s) 232 may be configured to execute the computer-executable instructions to cause various operations to be performed. The processor(s) 232 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

In some embodiments, the user device(s) 104 may include one or more antennas for enabling the user device(s) 104 to communicate with various other devices over one or more network(s) 204. The antennas may transmit and/or receive signals from various other devices depicted in the architecture 200. The user device(s) 104 may include one or more transceivers (or a receiver and/or transmitter) that may receive and/or transmit data. In some embodiments, the one or more transceivers may be coupled with the one or more antennas associated with the user device(s) 104.

The data storage 234 may store program instructions that are loadable and executable by the processor(s) 232, as well as data manipulated and generated by the processor(s) 232 during execution of the program instructions. The program instructions may be loaded into the memory 236 as needed for execution. Depending on the configuration and implementation of the user device(s) 104, the memory 236 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 236 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The user device(s) 104 may further include additional data storage 234 such as removable storage and/or non-removable storage including, but not limited to, magnetic storage, optical disk storage, and/or tape storage. Data storage 234 may provide non-volatile storage of computer-executable instructions and other data. The memory 236 and/or the data storage 234, removable and/or non-removable, are examples of computer-readable storage media (CRSM).

The user device(s) 104 may further include network interface(s) 240 that facilitate communication between the user device(s) 104 and other devices of the illustrative system architecture 200 (e.g., datastore(s) 106, server(s) 108, etc.) or application software via the network(s) 204. The user device(s) 104 may additionally include one or more input/output (I/O) interfaces 238 (and optionally associated software components such as device drivers) that may support interaction between a user 102 and a variety of I/O devices, such as a keyboard, a mouse, a pen, a pointing device, a voice input device, a touch input device, a display, speakers, a camera, a microphone, a printer, and so forth.

Referring again to the data storage 234, various program modules, applications, or the like may be stored therein that may comprise computer-executable instructions that when executed by the processor(s) 232 cause various operations to be performed. The memory 236 may have loaded from the data storage 234 one or more operating systems (O/S) 242 that may provide an interface between other application software (e.g., dedicated applications, a browser application, a web-based application, a distributed client-server application, etc.) executing on the user device 104 and the hardware resources of the user device 104. More specifically, the O/S 242 may include a set of computer-executable instructions for managing the hardware resources of the user device(s) 104 and for providing common services to other application programs (e.g., managing memory allocation among various application programs). The O/S 242 may include any operating system now known or which may be developed in the future including, but not limited to, any mobile operating system, desktop or laptop operating system, mainframe operating system, or any other proprietary or open-source operating system.

The data storage 234 may further include one or more database management systems (DBMS) 244 for accessing, retrieving, storing, and/or manipulating data stored in one or more datastores (e.g., datastore 106). The DBMS 244 may use any of a variety of database models (e.g., relational model, object model, etc.) and may support any of a variety of query languages.

The data storage 234 may additionally include various other program modules that may include computer-executable instructions for supporting a variety of associated functionality. For example, the data storage 234 may include one or more data collection module(s) 246, one or more coverage prediction module(s) 248, and/or one or more application(s) 250.

The data collection module(s) 246 may include computer-executable instructions that in response to execution by the processor(s) 232 cause operations to be performed including receiving input from a user 102. The data collection module(s) 246 may be responsible for receiving or otherwise obtaining information associated with a current location of the user device 104. For example, the data collection module(s) 246 may obtain information from a global positioning system executing on the user device 104. The data collection module(s) 246 may also be responsible for obtaining coverage information associated with a wireless network (e.g., cellular network) associated with the user device 104. For example, the data collection module(s) 246 may communicate with one or more servers 108 or one or more datastores 106 to obtain coverage information for a wireless network. Additionally, the data collection module(s) 246 may be responsible for obtaining and storing historic information associated with the user device 104. For example, the data collection module(s) 246 may record or store historic wireless coverage information for the user device 104 where the signal strength of the user device may be recorded along a particular path or during a specific time period.

The coverage prediction module(s) 248 may include computer-executable instructions that in response to execution by the processor(s) 232 cause operations to be performed including receiving or otherwise obtaining data collected by the data collection module(s) 246. The coverage prediction module(s) 248 may generate a prediction in the change of coverage associated with a user device 104. In some embodiments, the coverage prediction module(s) 248 may generate a prediction in change of coverage based at least in part on information collected by the data collection module(s) 246 (e.g., current location of user device, coverage information, historic information, etc.). In some embodiments, the coverage prediction module(s) 248 may correlate the coverage information and the current location of the user device 104. The coverage prediction module(s) 248 may apply one or more algorithms or one or more rules to determine an estimated change in wireless coverage, duration of the change, distance of the change, or the like. In some embodiments, the coverage prediction module(s) 248 may generate a notification based at least in part on a predicted change in wireless coverage and transmit the notification to one or more applications 250.

The application(s) 250 may include computer-executable instructions that in response to execution by the processor(s) 232 cause operations to be performed including executing of different functionality specific to the application(s) 250. The application(s) 250 may receive the notification from the coverage prediction module(s) 248. In some embodiments, the application(s) 250, in response to receiving the notification, may initiate data synchronization with one or more remote servers, buffer additional information based at least in part on the information received in the notification, or the like.

Within the data storage 234, one or more modules may be stored. As used herein, the term module may refer to a functional collection of instructions that may be executed by the one or more processor(s) 232. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The server(s) 108 may include one or more processors (processor(s)) 252 and one or more memories 256 (referred to herein generically as memory 256). The processor(s) 252 may include any suitable processing unit capable of accepting digital data as input, processing the input data based on stored computer-executable instructions, and generating output data. The computer-executable instructions may be stored, for example, in the data storage 254 and may include, among other things, operating system software and application software. The computer-executable instructions may be retrieved from the data storage 254 and loaded into the memory 256 as needed for execution. The processor(s) 252 may be configured to execute the computer-executable instructions to cause various operations to be performed. The processor(s) 252 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

In some embodiments, the server(s) 108 may include one or more antennas for enabling the server(s) 108 to communicate with various other devices over one or more network(s) 204. The antennas may transmit and/or receive signals from various other devices depicted in the architecture 200. The server(s) 108 may include one or more transceivers (or a receiver and/or transmitter) that may receive and/or transmit data. In some embodiments, the one or more transceivers may be coupled with the one or more antennas associated with the server(s) 108.

The data storage 254 may store program instructions that are loadable and executable by the processor(s) 252, as well as data manipulated and generated by the processor(s) 252 during execution of the program instructions. The program instructions may be loaded into the memory 256 as needed for execution. Depending on the configuration and implementation of the server(s) 108, the memory 256 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 256 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The server(s) 108 may further include additional data storage 254 such as removable storage and/or non-removable storage including, but not limited to, magnetic storage, optical disk storage, and/or tape storage. Data storage 254 may provide non-volatile storage of computer-executable instructions and other data. The memory 256 and/or the data storage 254, removable and/or non-removable, are examples of computer-readable storage media (CRSM).

The server(s) 108 may further include network interface(s) 260 that facilitate communication between the server(s) 108 and other devices of the illustrative system architecture 200 (e.g., user device(s) 104, datastore(s) 106, etc.) or application software via the network(s) 204. The server(s) 108 may additionally include one or more input/output (I/O) interfaces 258 (and optionally associated software components such as device drivers) that may support interaction between a user 102 and a variety of I/O devices, such as a keyboard, a mouse, a pen, a pointing device, a voice input device, a touch input device, a display, speakers, a camera, a microphone, a printer, and so forth.

Referring again to the data storage 254, various program modules, applications, or the like may be stored therein that may comprise computer-executable instructions that when executed by the processor(s) 252 cause various operations to be performed. The memory 256 may have loaded from the data storage 254 one or more operating systems (O/S) 262 that may provide an interface between other application software (e.g., dedicated applications, a browser application, a web-based application, a distributed client-server application, etc.) executing on the server(s) 108 and the hardware resources of the server(s) 108. More specifically, the O/S 262 may include a set of computer-executable instructions for managing the hardware resources of the server(s) 108 and for providing common services to other application programs (e.g., managing memory allocation among various application programs). The O/S 262 may include any operating system now known or which may be developed in the future including, but not limited to, any mobile operating system, desktop or laptop operating system, mainframe operating system, or any other proprietary or open-source operating system.

The data storage 254 may further include one or more database management systems (DBMS) 264 for accessing, retrieving, storing, and/or manipulating data stored in one or more datastores (e.g., datastore 106). The DBMS 264 may use any of a variety of database models (e.g., relational model, object model, etc.) and may support any of a variety of query languages.

The data storage 254 may additionally include various other program modules that may include computer-executable instructions for supporting a variety of associated functionality. For example, the data storage 254 may include one or more coverage data module(s) 266.

The coverage data module(s) 266 may include computer-executable instructions that in response to execution by the processor(s) 252 cause operations to be performed including obtaining coverage information from one or more wireless service providers. In some embodiments, the coverage data module(s) 266 may generate a coverage map based at least in part on coverage information obtained from wireless service providers, one or more datastore(s) 106, or the like. In some embodiments, the coverage data module(s) 266 may receive real-time data from multiple user devices regarding their current coverage status and may generate a coverage map based at least in part on information received from the multiple user devices 104. In some embodiments, the coverage data module(s) 266 may transmit the generated coverage map and additional coverage information to datastore(s) 106 for storage. The data may later be retrieved by the server(s) 108 and/or user device(s) 104.

Within the data storage 254, one or more modules may be stored. As used herein, the term module may refer to a functional collection of instructions that may be executed by the one or more processor(s) 252. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

Those of ordinary skill in the art will appreciate that any of the components of the system architecture 200 may include alternate and/or additional hardware, software, or firmware components beyond those described or depicted without departing from the scope of the disclosure. More particularly, it should be appreciated that hardware, software, or firmware components depicted or described as forming part of any of the illustrative components of the system architecture 200, and the associated functionality that such components support, are merely illustrative and that some components may not be present or additional components may be provided in various embodiments. While various program modules have been depicted and described with respect to various illustrative components of the system architecture 200, it should be appreciated that the functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of hardware, software, and/or firmware for implementing the functionality. Accordingly, it should be appreciated that the functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative system architecture 200 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative system architecture 200, or additional functionality.

Illustrative Processes

Figure 3:
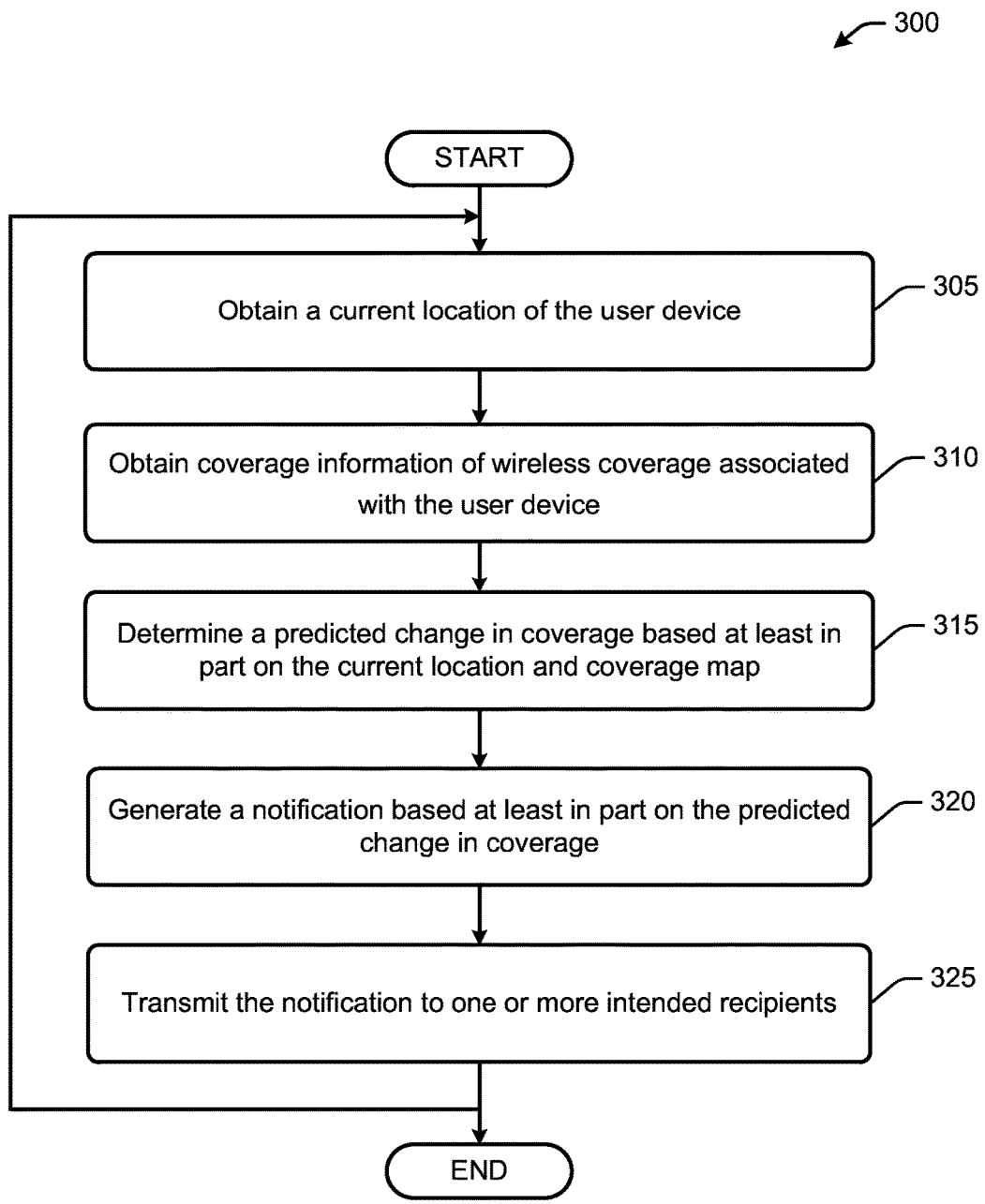
FIG. 3 is a process flow diagram of an illustrative method for wireless coverage indication in accordance with one or more embodiments of the disclosure.

FIG. 3 is a process flow diagram of an illustrative method for wireless coverage indication in accordance with one or more embodiments of the disclosure. At block 305, the user device 104 may obtain a current location of the user device 104. In some embodiments, the data collection module(s) 246 may obtain a current location of the user device 104. The current location of the user device 104 may be obtained from a global positioning system executing on the user device 104 or the like.

At block 310, coverage information of wireless coverage associated with the user device 104 may be obtained. The coverage information may be a map of the coverage for a wireless network associated with the user device 104. The coverage information may be obtained by the data collection module(s) 246. In some embodiments, the coverage information may be provided to the user device 104 by the service provider of the wireless service associated with the user device 104. In some embodiments, the coverage information may be retrieved from a database, such as datastore 106. In some embodiments, the coverage information may be retrieved or otherwise obtained from one or more server(s) 108.

At block 315, a predicted change in coverage may be determined based at least in part on the current location and coverage information. In some embodiments, the coverage prediction module 248 may determine a predicted change in coverage in the wireless service associated with the user device 104. In some embodiments, the coverage prediction module 248 may correlate the current location of the user device 104 and the obtained coverage information. The coverage prediction module 248 may apply one or more prediction algorithms, rules, or policies to the correlated current location of the user device 104 and coverage information. In some embodiments, the coverage prediction module 248 may calculate or determine an estimated time prior to the predicted change in coverage, an estimated duration for the predicted change in coverage, an estimated distance associated with the predicted change in coverage, and the like. In some embodiments, the coverage prediction module 248 may calculate or determine the predicted change in coverage of the wireless service of the user device 104 based at least in part on additional information, such as historic coverage information associated with the user device 104. For instance, the data collection module 246 may have recorded or otherwise stored coverage information associated with previous routes taken by the user device 104. For example, if a user 102 has previously driven on a segment of highway which has various changes in coverage, the data collection module 246 may have recorded the changes. The coverage information captured by the data collection module 246 may be used by the coverage prediction module 248 in calculating or determining a predicted change in coverage.

At block 320, a notification may be generated based at least in part on the predicted change in coverage. In some embodiments, the notification may include an indication of a predicted change in coverage, the time prior to the predicted change in coverage, the estimated duration of the predicted change in coverage, and/or the estimated distance associated with the predicted change in coverage. In some embodiments, the notification may be presented to the user 102 to permit the user 102 to take adequate action prior to the loss of wireless coverage.

At block 325, the notification may be transmitted to one or more intended recipients. For example, the notification may be transmitted to one or more applications 250 executing on the user device 104. In some embodiments, the applications 250 may initiate data synchronization prior to the predicted change in wireless coverage to ensure the user device obtains the latest available data. In some embodiments, the applications 250 may request additional information to be buffered. For example, based on the available wireless coverage, the capacity of the user device 104, and/or the duration of the predicted change in coverage, an application that streams data, such as a radio application or a movie application, may request additional data to be buffered to enable the application 250 to continue streaming the data from the user device 104 to the user 102 despite a weak or no signal from the wireless network. In some embodiments, the one or more intended recipients may be a user. A user may have sent a query for predicted coverage change information. A notification may be generated and transmitted in response to receiving the query request.

In some embodiments, the process depicted in flow diagram 300 may be in response to a query for predicted coverage change indication initiated by the user 102. In some embodiments, the process may execute continuously in the background of the user device 104. In some embodiments, the process may execute continuously in the background when a specific application 250 has been launched or is executing.

In some embodiments, the user 102 may establish a geofence using the user device 104. A geofence may be a virtual perimeter for a real-world geographic area. The user 102 may indicate locations to be associated with the geofence using the user device 104. The user 102 may request that if the user device 104 crosses the geofence and/or there is a predicted change in wireless coverage, a notification be generated and transmitted or displayed.

In some embodiments, the user 102 may specify, through an interface, one or more thresholds and/or one or more types of notifications. For example, the user 102 may specify that a notification should only be generated and transmitted if the predicted change in coverage is predicted to last for a short duration of time and/or distance (e.g., less than two minutes or 1 mile). In some embodiments, the user 102 may specify the types of notifications to be generated. For example, the user 102 may specify that a message be presented to the user 102 so the user has the option to perform certain tasks prior to the loss of coverage.

In some embodiments, the server 108 may generate coverage information based at least in part on information received from one or more datastore(s) 106, a service provider associated with the user device 104, and/or one or more user device(s) 104. For example, the server 108 may receive real-time coverage indications or notifications from user device(s) 104 within a specific coverage area. The server 108 may aggregate the received information from the different user devices and generate a real-time coverage map which may be made available to the user device(s) 104 and other server(s) 108. In some embodiments, the server 108 may also use information obtained from one or more datastore(s) 106, the service provider associated with the user device 104, and/or other server(s) 108 to generate coverage information and make the generated coverage information available for consumption or store the generated coverage information in one or more datastore(s) 106.

In one embodiment, a non-transitory computer-readable medium may store computer-executable instructions which, when executed by a processor, cause the processor to perform operations, including obtaining a current location of a user device; obtaining coverage information of wireless coverage associated with the user device; determining a predicted change in wireless coverage based at least in part on the current location and the coverage information; generating a notification based at least in part on the predicted change in coverage; and transmitting the notification to one or more intended recipients.

In one aspect of an embodiment, the operations may further include updating, by the one or more applications, data based at least in part on receiving the notification.

In one aspect of an embodiment, the operations may further include receiving the coverage information from a server or a database.

In one aspect of an embodiment, the operations may further include establishing a geofence based at least in part on data received from a user of the user device; and generating a notification based at least in part on the predicted change in coverage or crossing the geofence by the user device.

In one aspect of an embodiment, the operations may further include determining a duration of the predicted change in coverage or a distance of the predicted change in coverage based at least in part on the current location of a user device and the coverage information.

In one aspect of an embodiment, the one or more intended recipients may be a user of the user device and the operations may further include receiving, from the user of the user device, a query for predicted coverage change; and generating the notification in response to the query.

In one aspect of an embodiment, the one or more intended recipients may be at least one of a user of the user device or one or more applications executing on the user device.

In another embodiment, a computer-implemented method may be provided. The computer-implemented method may include obtaining, by a user device comprising one or more processors, a current location of the user device; obtaining, by the user device, coverage information of wireless coverage associated with the user device; determining, by the user device, a predicted change in coverage based at least in part on the current location and the coverage information; generating, by the user device, a notification based at least in part on the predicted change in coverage; and transmitting, by the user device, the notification to one or more intended recipients.

In one aspect of an embodiment, the method may further include updating, by the one or more applications, data based at least in part on receiving the notification.

In one aspect of an embodiment, the method may further include receiving the coverage information from a server or a database.

In one aspect of an embodiment, the method may further include establishing a geofence based at least in part on data received from a user of the user device; and generating a notification based at least in part on the predicted change in coverage or crossing the geofence by the user device.

In one aspect of an embodiment, the method may further include determining a duration of the predicted change in coverage or a distance of the predicted change in coverage based at least in part on the current location of a user device and the coverage information.

In one aspect of an embodiment, the one or more intended recipients may be a user of the user device and the method may further include receiving, from the user of the user device, a query for predicted coverage change; and generating the notification in response to the query.

In one aspect of an embodiment, the one or more intended recipients may be at least one of a user of the user device or one or more applications executing on the user device.

In another embodiment, a system may include at least one memory storing computer-executable instructions; and at least one processor, wherein the at least one processor is configured to access the at least one memory and to execute the computer-executable instructions to obtain a current location of a user device; obtain coverage information of wireless coverage associated with the user device; determine a predicted change in coverage based at least in part on the current location and the coverage information; generate a notification based at least in part on the predicted change in coverage; and transmit the notification to one or more intended recipients.

In one aspect of an embodiment, the at least one processor may be further configured to execute the computer-executable instructions to update, by the one or more applications, data based at least in part on receiving the notification.

In one aspect of an embodiment, the at least one processor may be further configured to execute the computer-executable instructions to receive the coverage information from a server or a database.

In one aspect of an embodiment, the at least one processor may be further configured to execute the computer-executable instructions to establish a geofence based at least in part on data received from a user of the user device; and generate a notification based at least in part on the predicted change in coverage or crossing the geofence by the user device.

In one aspect of an embodiment, the at least one processor may be further configured to execute the computer-executable instructions to determine a duration of the predicted change in coverage or a distance of the predicted change in coverage based at least in part on the current location of a user device and the coverage information.

In one aspect of an embodiment, the one or more intended recipients may be a user of the user device and the at least one processor may be further configured to execute the computer-executable instructions to receive, from the user of the user device, a query for predicted coverage change; and generate the notification in response to the query.

In another embodiment, an apparatus may be provided. The apparatus may include at least one antenna; at least one transceiver; at least one memory storing computer-executable instructions; and at least one processor, wherein the at least one processor may be configured to access the at least one memory and to execute the computer-executable instructions to obtain a current location of a user device; obtain coverage information of wireless coverage associated with the user device; determine a predicted change in coverage based at least in part on the current location and the coverage information; generate a notification based at least in part on the predicted change in coverage; and transmit the notification to one or more intended recipients.

In one aspect of an embodiment, the at least one processor may be further configured to execute the computer-executable instructions to update, by the one or more applications, data based at least in part on receiving the notification.

In one aspect of an embodiment, the at least one processor may be further configured to execute the computer-executable instructions to receive the coverage information from a server or a database.

In one aspect of an embodiment, the at least one processor may be further configured to execute the computer-executable instructions to establish a geofence based at least in part on data received from a user of the user device; and generate a notification based at least in part on the predicted change in coverage or crossing the geofence by the user device.

In one aspect of an embodiment, the at least one processor may be further configured to execute the computer-executable instructions to determine a duration of the predicted change in coverage or a distance of the predicted change in coverage based at least in part on the current location of a user device and the coverage information.

In one aspect of an embodiment, the one or more intended recipients may be a user of the user device and the at least one processor may be further configured to execute the computer-executable instructions to receive, from the user of the user device, a query for predicted coverage change; and generate the notification in response to the query.

In another embodiment, a system may be provided. The system may include a means for obtaining a current location of the user device; a means for obtaining coverage information of wireless coverage associated with the user device; a means for determining a predicted change in coverage based at least in part on the current location and the coverage information; a means for generating a notification based at least in part on the predicted change in coverage; and a means for transmitting the notification to one or more intended recipients.

In one aspect of an embodiment, the system may further include a means for updating, by the one or more applications, data based at least in part on receiving the notification.

In one aspect of an embodiment, the system may further include a means for receiving the coverage information from a server or a database.

In one aspect of an embodiment, the system may further include a means for establishing a geofence based at least in part on data received from a user of the user device; and a means for generating a notification based at least in part on the predicted change in coverage or crossing the geofence by the user device.

In one aspect of an embodiment, the system may further include a means for determining a duration of the predicted change in coverage or a distance of the predicted change in coverage based at least in part on the current location of a user device and the coverage information.

In one aspect of an embodiment, the one or more intended recipients may be a user of the user device and the system may further include a means for receiving, from the user of the user device, a query for predicted coverage change; and a means for generating the notification in response to the query.

In one aspect of an embodiment, the one or more intended recipients may be at least one of a user of the user device or one or more applications executing on the user device.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A non-transitory computer-readable medium storing computer-executable instructions which, when executed by a processor, cause the processor to perform operations comprising:
   obtaining a current location of a user device;
   obtaining coverage information of wireless coverage associated with the user device;
   obtaining a historic coverage information of wireless coverage associated with the user device;
   determining a correlation between the current location and the coverage information;
   determining a predicted change in wireless coverage based at least in part on the correlation or the historic information;
   generating a notification based at least in part on the predicted change in coverage; and
   transmitting the notification to one or more intended recipients.

2. The non-transitory computer-readable medium of claim 1, wherein the operations further comprise:
   updating, by one or more applications, data based at least in part on receiving the notification.

3. The non-transitory computer-readable medium of claim 1, wherein the operations further comprise:
   receiving the coverage information from a server or a database.

4. The non-transitory computer-readable medium of claim 1, wherein the operations further comprise:
   establishing a geofence based at least in part on data received from a user of the user device; and
   generating a notification based at least in part on the predicted change in coverage or crossing the geofence by the user device.

5. The non-transitory computer-readable medium of claim 1, wherein the operations further comprise:
   determining a duration of the predicted change in coverage or a distance of the predicted change in coverage based at least in part on the current location of a user device and the coverage information.

6. The non-transitory computer-readable medium of claim 1, wherein the one or more intended recipients is a user of the user device and the operations further comprise:
   receiving, from the user of the user device, a query for predicted coverage change; and
   generating the notification in response to the query.

7. The non-transitory computer-readable medium of claim 1, wherein the one or more intended recipients is at least one of a user of the user device or one or more applications executing on the user device.

8. A method comprising:
   obtaining, by a user device comprising one or more processors, a current location of the user device;
   obtaining, by the user device, coverage information of wireless coverage associated with the user device;
   obtaining, by the user device, a historic coverage information of wireless coverage associated with the user device;
   determining, by the user device, a correlation between the current location and the coverage information;
   determining, by the user device, a predicted change in coverage based at least in part on correlation or the historic information;
   generating, by the user device, a notification based at least in part on the predicted change in coverage; and
   transmitting, by the user device, the notification to one or more intended recipients.

9. The method of claim 8, further comprising:
   updating, by one or more applications, data based at least in part on receiving the notification.

10. The method of claim 8, further comprising:
    receiving, by the user device, the coverage information from a server or a database.

11. The method of claim 8, further comprising:
    establishing, by the user device, a geofence based at least in part on data received from a user of the user device; and
    generating, by the user device, a notification based at least in part on the predicted change in coverage or crossing the geofence by the user device.

12. The method of claim 8, further comprising:
    determining, by the user device, a duration of the predicted change in coverage or a distance of the predicted change in coverage based at least in part on the current location of a user device and the coverage information.

13. The method of claim 8, wherein the one or more intended recipients is a user of the user device and the method further comprises:
    receiving, from the user of the user device, a query for predicted coverage change; and
    generating the notification in response to the query.

14. The method of claim 8, wherein the one or more intended recipients is at least one of a user of the user device or one or more applications executing on the user device.

15. A system comprising:
    at least one antenna;
    at least one transceiver;
    at least one memory storing computer-executable instructions; and
    at least one processor, wherein the at least one processor is configured to access the at least one memory and to execute the computer-executable instructions to:
        obtain a current location of a user device;
        obtain coverage information of wireless coverage associated with the user device;
        obtain a historic coverage information of wireless coverage associated with the user device;
        determine a correlation between the current location and the coverage information;
        determine a predicted change in coverage based at least in part on the correlation or the historic information;
        generate a notification based at least in part on the predicted change in coverage; and
        transmit the notification to one or more intended recipients.

16. The system of claim 15, wherein the at least one processor is further configured to execute the computer-executable instructions to:
    update, by one or more applications, data based at least in part on receiving the notification.

17. The system of claim 15, wherein the at least one processor is further configured to execute the computer-executable instructions to:
    receive the coverage information from a server or a database.

18. The system of claim 15, wherein the at least one processor is further configured to execute the computer-executable instructions to:
    establish a geofence based at least in part on data received from a user of the user device; and
    generate a notification based at least in part on the predicted change in coverage or crossing the geofence by the user device.

19. The system of claim 15, wherein the at least one processor is further configured to execute the computer-executable instructions to:
    determine a duration of the predicted change in coverage or a distance of the predicted change in coverage based at least in part on the current location of a user device and the coverage information.

20. The system of claim 15, wherein the one or more intended recipients is a user of the user device and the at least one processor is further configured to execute the computer-executable instructions to:
    receive, from the user of the user device, a query for predicted coverage change; and
    generate the notification in response to the query.

* * * * *